Feb. 10. 1942.   T. B. PERKINS   2,272,849
VOLTAGE INDICATING DEVICE
Filed Oct. 28, 1939
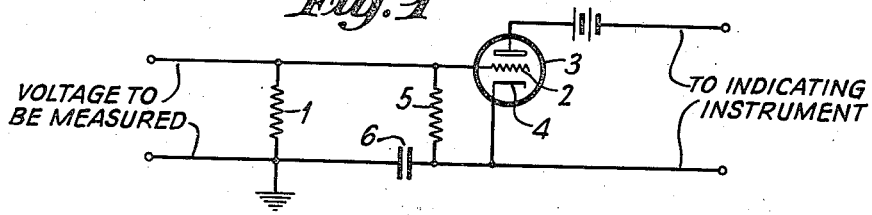
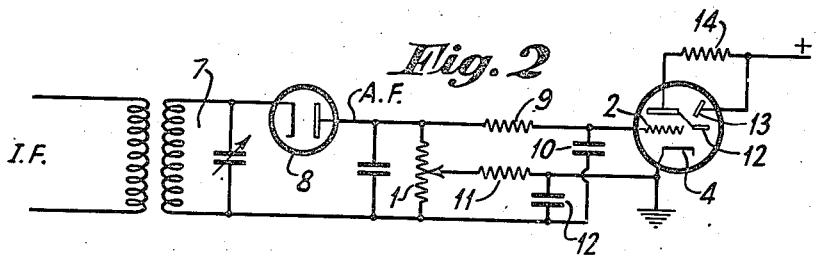
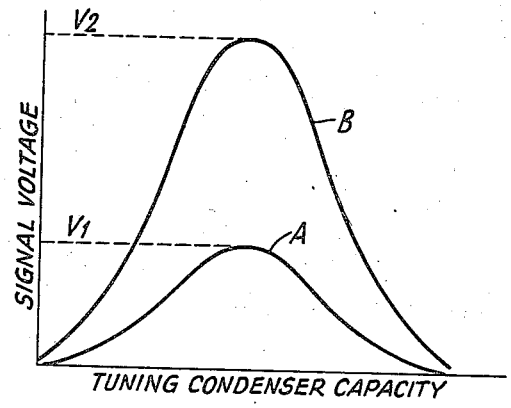
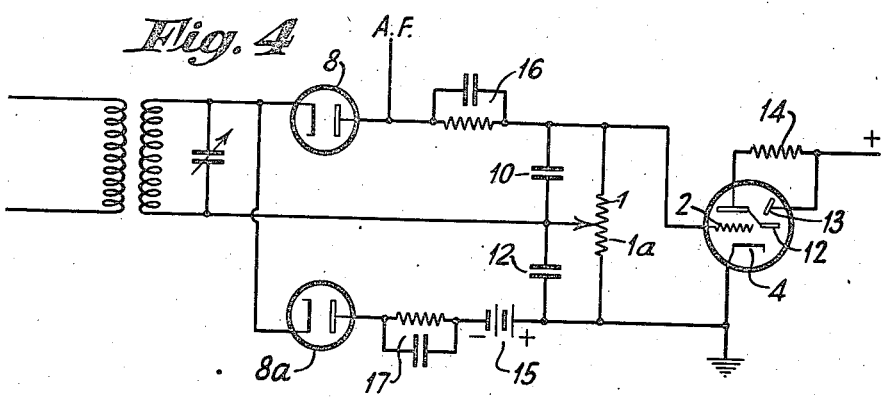
INVENTOR.
THEODORE B. PERKINS
BY
Charles McClair
ATTORNEY.

Patented Feb. 10, 1942

2,272,849

UNITED STATES PATENT OFFICE 2,272,849

VOLTAGE INDICATING DEVICE

Theodore B. Perkins, West Orange, N. J., assignor to Radio Corporation of America, a corporation of Delaware Application October 28, 1939, Serial No. 301,735

6 Claims. (Cl. 171—95)

My invention relates to visual voltage indicators, particularly to devices for indicating voltage changes such as tuning indicators for radio receiving sets.

Voltage indicating devices are usually more sensitive to voltages well within the operating range of the device than to extreme voltages. When, for example, a visual tuning indicating device for radio receivers of usual construction is adjusted to accurately indicate resonance with a carrier wave of average strength, the indicating device will not accurately indicate when the receiver is tuned to a carrier of abnormal high or low strength.

An object of my invention is a voltage indicating device that is sensitive over a wide range of voltages.

A more specific object of my invention is a visual tuning indicator which will accurately indicate resonance in a radio receiver for both strong and weak signals.

The novel features which I believe characterize my invention are set forth with particularity in the appended claims, but preferred embodiments of my invention are described in the following specification and shown in the accompanying drawing in which—

Figure 1 diagrammatically represents a voltage indicating circuit embodying my invention;

Figure 2 shows my novel voltage indicating device adapted for tuning indication;

Figure 3 is a graphic representation of signal voltage as a function of resonance or tuning condenser position for a better understanding of Figure 2; and Figure 4 is another tuning indicator device embodying my invention.

My novel voltage indicator comprises an electron discharge device with an anode, and input electrodes including a grid and a cathode. The unknown voltage to be indicated is impressed upon the cathode as well as on the grid of the electron discharge device, and a network is coupled between the unknown voltage source and one of the input electrodes to delay voltage changes of the one input electrode and reduce, after the delay, the maximum difference in voltage that is impressed upon the input electrodes.

In Figure 1 the voltage to be measured is impressed upon a coupling resistor 1, one end of which is connected to the grid 2 of a conventional triode 3. The voltages impressed upon the grid are also impressed upon the cathode 4 through resistor 5. The cathode, however, is coupled to the opposite side of the voltage source through condenser 6 so that changes in grid voltage are followed, after a time delay, by corresponding changes in cathode voltage, the lag in the cathode voltage change behind the grid voltage change being determined by the values of the condenser and its resistor 5. Instantaneous changes in unknown voltages are accompanied by corresponding changes in the output circuit of the triode, which when calibrated with an indicating instrument such as a voltmeter or milliameter may accurately indicate the unknown voltage. When the unknown voltage swings to an abnormal value, say highly negative, the grid goes correspondingly negative and may swing beyond the straight portion of the grid voltage-plate current characteristic curve of the tube so that the plate current of the triode is no longer proportional to the unknown voltage and the output of the tube becomes insensitive to grid voltage changes. As the difference in potential between the grid and cathode is reduced by returning the potential of the cathode to a value near the potential of the grid, the tube is then operated on the straight portion of its characteristic curve and the plate current becomes sensitive to grid voltage changes. Delay in the change of the cathode voltage is conveniently adjusted by the size of the resistor 5 and condenser 6.

My novel voltage indicating device is shown in Figure 2 adapted for tuning indication where the input of the triode is coupled to a detector circuit 7 of a radio receiver. The rectifier circuit is conventional and comprises a diode rectifier 8 connected in series with a local or coupling resistor 1 and the secondary of a transformer, the primary of which is coupled in the signal circuit of the receiver, such as a radio or intermediate frequency amplifier. One end of the resistor 1 is coupled to the grid 2 of the triode. Preferably a resistor 9 is inserted in the grid circuit and a condenser 10 is connected between the grid and the opposite end of the voltage source 1 to eliminate signal voltage variations and permit the grid voltage to follow the direct current component of the rectified signal. The rectified voltage is also applied to the cathode 4 of the triode through a resistor 11, the cathode being coupled through condenser 12 to the opposite end of the voltage source. The time constant of the resistor-condenser network 11—12 of the cathode circuit is preferably higher than the time constant of the resistor-condenser network 9—10 of the grid circuit.

The triode in Figure 2 may conveniently be the triode section of a conventional tuning indicator tube, for example, of the type commercially known as the 6E5, in which is incorporated a target electrode 13 coated with luminescent material that glows when bombarded with electrons from the cathode 4. Between the target and cathode is a ray control electrode 12, usually consisting of a rod parallel to the cathode and between the target and the cathode and connected to and supported by the anode of the triode. Space current through the triode section determines the voltage drop across resistor 14 and the potential difference between the ray control electrode 12 and target 13, which in turn controls the width of an electron shadow cast by the ray control electrode on the target. An increase in a positive direction of the grid voltage increases the space current through the triode, increases the voltage drop across resistor 14, increases the voltage difference between electrode 12 and target 13, and widens the dark area on the target.

As a carrier wave of average strength, represented by curve A, Figure 3, is tuned-in, the tuning condenser is manipulated back and forth until the maximum voltage $V_1$ is indicated by the narrowest shadow on the target. When the target is adjusted to just close for a signal $V_1$, wide changes of shadow are accompanied by small movements of the tuning condenser so that the desired station may be accurately tuned.

If a carrier wave, represented by curve B, is of such a strength $V_2$ as to drive the grid negative and beyond the normal operating range of the triode, the target shadow closes and becomes insensitive to a tuning condenser position and the visual indicator is of no aid in tuning-in the carrier.

In my improved tuning indicating device voltage $V_2$ is also impressed upon the cathode of the indicator tube and increases it in a negative direction after a short delay to decrease the potential difference between the cathode and grid and hence return the triode to its normal operating range, and the target shadow to its normal size and greatest sensitivity. The time delay in the cathode circuit network is sufficiently large that the tuning condenser may be manipulated in the usual way to permit accurate tuning indication of average carriers, and when the indicator becomes insensitive on a strong carrier, tuning may be continued after a brief pause.

The cathode may be connected to an intermediate point on the coupling resistor 1 to bias the triode, for a given carrier strength, to any predetermined value. The shadow angle then remains partly or fully closed with said given carrier strength and will accurately indicate tuning of carrier waves lower or higher in strength than said carrier.

If a fixed biasing source, such as a battery, is connected in the grid circuit, the electron shadow of the indicator tube assumes some intermediate size for no signal, and decreasing as well as increasing voltages, produced by manipulation of the tuning circuit, are indicated by narrowing and widening of the electron shadow.

Accurate tuning indication for a wide range of carrier strengths has been obtained with the circuit shown in Figure 2 with resistances 9 and 11 respectively .68 megohm and 5.0 megohms, condensers 10 and 12 respectively .05 microfarad and .5 microfarad with a coupling resistance 1 of .2 megohm and a parallel filter resistance of 150 micromicrofarads. The commercial 6E5 type tuning indicator tube connected in the usual way is unresponsive to carrier waves producing grid voltage below −8 volts, whereas the tube in the circuit of Figure 2 has been made responsive to carrier waves producing as high as −220 volts on the grid.

Separate rectifiers may be provided to supply the voltage to be indicated to the grid and to the cathode as shown in Figure 4. The two rectifiers 8 and 8a are connected in series with different sections of the coupling resistor 1—1a and the secondary of the signal transformer. By connecting the two condensers 10 and 12 with different values of capacity across the two legs of the coupling resistor, the necessary delay in the cathode circuit over the grid circuit may be easily obtained. According to a further feature of my invention, one rectifier may be statically biased by a direct current potential source 15 so that no current may flow through the rectifier 8a below a predetermined threshold voltage. This bias prevents a swing in cathode potential for carrier waves below a certain signal strength, the other rectifier 8 controlling the grid potential in the usual way. When a strong signal is tuned-in rectifier 8a conducts current and impresses a voltage upon the cathode after a time delay determined by condenser 12 and its parallel resistance to swing the cathode potential toward the grid potential and hence reduces the potential difference between the grid and cathode and returns the tuning indicator sensitivity. Resistors of loading circuits 16 and 17 serve as audio frequency loading resistances for the tube and as charging resistances for the condensers 10 and 12. If desired the two rectifiers 8 and 8a may be the two anode and cathode sections of a single tube, such as the type commercially known as the 6H6. Condensers 10 and 12 may be, respectively, .05 microfarad and 2 microfarads, while each leg 1 and 1a of the coupling resistor in Figure 4 may be about 1 megohm. The filter circuits 16 and 17 should comprise a resistance of about .5 megohm and a condenser of about 50 micromicrofarads to pass intermediate and radio frequencies.

While my novel indicating device has been specifically described as a tuning indicator it may be connected to a signalling circuit to indicate modulation peaks of a carrier wave, or it may be used in a wavemeter to indicate intermediate frequency resonant curves, or it may be used in impedance measuring devices employing the resonance method of measuring.

My novel voltage indicating device is sensitive over a wide range of voltage, is simple in construction and easy to operate.

I claim:

1. A voltage indicator comprising an electron discharge device with an anode, and input electrodes including a grid and a cathode, a resistor connected at its ends to the voltage to be measured, a direct current connection between said grid and one end of said resistor, a second direct current connection between said cathode and said end of said resistor, a second resistor, said second resistor being in said cathode connection, and a condenser between said cathode and the other end of the first mentioned resistor.

2. A voltage indicator comprising an electron discharge device with a cathode, a first anode, the electron collecting surface of the anode being coated with an electron sensitive luminescent material, and a ray control electrode between the anode and cathode, a triode comprising said cathode, a grid and a second anode, means for changing the potential of said ray control electrode with respect to said first anode in response to changes of an unknown voltage comprising a coupling circuit between said grid and the source of the unknown voltage, and a coupling circuit between said cathode and a point on said source of unknown voltage of the same polarity as the grid, the second mentioned circuit including means to delay cathode voltage changes.

3. A tuning indicator comprising an anode, a grid and a cathode, a resistor, means for passing a direct current of unknown voltage through said resistor, said grid being connected to a point on said resistor, said cathode being connected to a point on said resistor adjacent the first mentioned point so that changes in voltage of the grid and voltage changes of the cathode are in the same direction, a condenser connected between the cathode and a point on said resistor remote from the grid and cathode connection.

4. A voltage indicator comprising an electron discharge device with input electrodes including a grid and a cathode, and output electrodes including an anode and said cathode, means for impressing an unknown voltage on the input electrodes and voltage indicating means connected to the output electrodes, a resistor connected between said grid and the source of unknown voltage, a condenser connected between said grid and said source, a second resistor connected between said cathode and said source and a second condenser connected between said cathode and said source, the time constant of the first resistor and condenser being different from the time constant of the second resistor and condenser.

5. A voltage indicator comprising an anode, a cathode and a grid, a visual voltage indicating means connected to the anode and cathode, means for impressing an unknown voltage on said grid, means for impressing said voltage on said cathode including means for changing the cathode voltage only in response to values of said voltage in excess of a predetermined value.

6. A voltage indicator comprising an electron discharge device with an anode and input electrodes including a grid and cathode, a resistor connected at its ends to the voltage to be measured, direct current connections between each input electrode and points on said resistor of common polarity, a condenser connected between one of said input electrodes and another point on said resistor of opposite polarity, and a second resistor in the direct current connection to said one input electrode.

THEODORE B. PERKINS.